United States Patent [19]

Novak et al.

[11] Patent Number: 4,886,618

[45] Date of Patent: Dec. 12, 1989

[54] ALDEHYDE OR IMINE OXYGEN SCAVENGERS FOR VINYL POLYMERIZATIONS

[75] Inventors: Ronald W. Novak, Chalfont; William D. Emmons, Huntington Valley, both of Pa.

[73] Assignee: Rohm and Haas Company, Philadelphia, Pa.

[21] Appl. No.: 180,715

[22] Filed: Apr. 4, 1988

Related U.S. Application Data

[60] Continuation of Ser. No. 835,138, Apr. 10, 1986, abandoned, which is a division of Ser. No. 632,553, Jul. 19, 1984.

[51] Int. Cl.[4] ........................ C09K 15/06; C09K 15/18

[52] U.S. Cl. ........................... 252/188.28; 252/400.53

[58] Field of Search ........................ 252/400.53, 188.28

[56] References Cited

U.S. PATENT DOCUMENTS

| | | | |
|---|---|---|---|
| 3,506,630 | 4/1970 | Beier et al. | 526/208 X |
| 3,551,423 | 12/1970 | Petersen | 546/242 |
| 4,017,652 | 4/1977 | Gruber | 427/54.1 |
| 4,395,361 | 7/1983 | Eickhoff et al. | 502/167 |

OTHER PUBLICATIONS

Reactions of UV Curable Resin Formulations and Neat Multifunctional Acrylates.

*Primary Examiner*—John F. Terapane
*Assistant Examiner*—Valerie D. Fee
*Attorney, Agent, or Firm*—Marc S. Adler; Carl W. Battle

[57] ABSTRACT

Oxygen scavengers, especially for vinyl polymerizations, comprising an aldehyde or imine of the formula $$R_3Q_n$$

wherein n is 1–4; $R_3$ is an organic radical having a valence of 1–4 or hydrogen; Q is of the formula

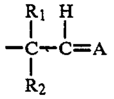

wherein A is 0 or $NR_4$; $R_2$, $R_2$, and $R_4$ are independently selected $C_{1-6}$ alkyl or aryl radicals or mixtures thereof are disclosed.

A preferred composition is a mixture of aldehydes which are the reaction product of (a) ethylene urea, (b) formaldehyde, (c) isobutyraldehyde, and (d) 2-ethylhexanal in a molar ratio of (a):(b) of 1:2 and of (a) to the sum of (c) and (d) of 1:2.

3 Claims, No Drawings

ALDEHYDE OR IMINE OXYGEN SCAVENGERS FOR VINYL POLYMERIZATIONS

This application is a continuation of application Ser. No. 835,138, filed Apr. 10, 1986, abandoned, which is a division of application Ser. No. 06/632,553 filed July 19, 1984, pending.

BACKGROUND OF THE INVENTION

1. Field of the Invention

This invention relates to oxygen scavengers useful in the polymerization of vinyl unsaturated monomers, oligomers, and polymers in the presence of oxygen.

2. Description of the Prior Art

Eickoff et al, U.S. Pat. No. 4,395,361, assigned to Proctor and Gamble Company, teach a class of oxygen-activated free radical polymerization catalysts comprising cobalt (II) compounds and certain autoxidizable cyclic hydrocarbons and benzaldehyde.

Eickoff et al also describe a method of catalyzing an oxygen-initiated free radical polymerization reaction using these catalysts. No other aldehydes than benzaldehyde are disclosed.

Gruber U.S. Pat. No. 4,017,652, assigned to PPG Industries, Inc., teaches oxygen inhibition of the photopolymerization of acrylic resins being reduced by employing a photocatalyst system containing an aromatic ketone and/or aromatic aldehyde photosensitizer of a certain type which promote polymerization through bimolecular photochemical reactions, and an aromatic ketone photoinitiator.

Petersen, U.S. Pat. No. 3,551,423, assigned to BASF, teaches production of certain amides by reaction of amides with formaldehyde and an appropriate CH-acid aldehyde and the use of the new amide products as textile finishes and as valuable intermediates for the production of amino aldehydes and aminocarboxylic acids, pharmaceuticals and aminoplasts. Peterson does not disclose utility of the aldehydes as oxygen scavengers, nor does he disclose the corresponding imines.

Collins et al, *Reactions of UV curable Resin Formulations and Neat Multifunctional Acrylates II Photoinitiated Polymerization of Neat* 1,6-*hexanedioldiacrylate,* Journal of Coatings Technology, Vol. 51, No. 648, January 1979, teach benzoin isobutyl ether photoinitiated polymerization of 1,6-hexanedioldiacrylate, and eliminating the inhibition by dissolved oxygen by the addition of N,N-dimethylaminobenzaldehyde and eosin-Y.

Imoto et al, *Vinyl Polymerization.* 364. *Polymerization of Methyl Methacrylate Initiated with Benzaldehyde,* J. Poly. Science: Polymer Chemistry Edition, 17:385–92 (1979) show an anaerobic initiation of the radical polymerization of methyl methacrylate with benzaldehyde. Oxygen scavenger activity is not needed in anaerobic reactions, and so Imoto et al is not pertinent to oxygen scavenging.

In recent years, certain vinyl monomer, oligomer, and polymer systems have been developed which have sufficiently high molecular weight and sufficiently low odor, volatility, and toxicity so as to be useful as non-volatile reactive components of high or 100% solids resin formulations which can be cured rapidly by free radical polymerization in the absence of oxygen, i.e. anaerobically, for example in radiation cure applications or in engineering adhesives where polymerization occurs between two substrates to be bonded. However, when cure of these vinyl unsaturated systems is attempted in the presence of air, i.e. aerobically, serious inhibition of free radical polymerization by oxygen at the air interface occurs. It is this problem to which the present invention is addressed.

It is an object of the present invention to provide a new class of highly efficient oxygen scavengers for use in compositions comprising at least one vinyl unsaturated monomer, oligomer or polymer. It is a further object of the invention to provide compositions comprising at least one vinyl unsaturated monomer, oligomer or polymer which have improved curing characteristics in the presence of oxygen.

SUMMARY OF THE INVENTION

These objects, and others as will become apparent from the following disclosure, are achieved by the present invention which comprises in one aspect the use as an oxygen scavenger system of compositions comprising an aldehyde or imine of the formula $$R_3Q_n$$

wherein n is 1–4; $R_3$ is an organic radical having a valence of 1–4 or hydrogen; Q is of the formula

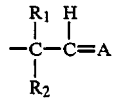

wherein A is 0 or $NR_4$; $R_1$, $R_2$, and $R_4$ are independently selected $C_{1-6}$ alkyl or aryl radicals or mixtures thereof.

In another aspect, the invention comprises the aforementioned aldehyde or imine and a transition metal ion selected from $Co^{++}$, $Cu^{++}$, and $Mn^{++}$. In another aspect the invention comprises the aldehyde or imine and a vinyl unsaturated monomer and/or polymer.

DETAILED DESCRIPTION OF THE INVENTION AND THE PREFERRED EMBODIMENTS

Various compositions which comprise at least one vinyl unsaturated monomer, oligomer, and polymer and which are designed for cure in the presence of oxygen are available in the field of paints and other coating compositions, gel coats, tank linings, polymer concrete, high solids baking finished and the like. A particular field in which oxygen inhibition occurs is in thin films which contain vinyl monomers where it is usually an object to obtain tack-free finishes rapidly. In some cases, the desired finish is hard, whereas in other cases, such as with roof mastics, the desired finish is flexible. Particularly important systems in which the oxygen scavengers described below are useful include unsaturated polyester, acrylic/melamine, reactive coalescent, vinyl ester, UV cure, concrete sealant, polymer concrete, engineering adhesive, and the like.

As mentioned before, the oxygen scavengers of the invention are selected from the group consisting of compounds of the formula $$R_3Q_n$$

wherein n is 1–4; $R_3$ is an organic radical having a valence of 1–4 or hydrogen; Q is of the formula

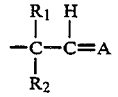

wherein A is 0 or $NR_4$; $R_1$, $R_2$, and $R_4$ are independently selected $C_{1-6}$ alkyl or aryl radicals or mixtures thereof.

$R_3$ is preferably of the formula $R_5Y\ CH_2$— wherein $R_5$ is hydrogen or an organical radical of 1-4 valence and selected from $C_1$—36 alkyl, cycloalkyl, aryl, arylalkyl, alkylaryl, and acyl; Y is 0 or $NR_6$; and $R_6$ is hydrogen or a $C_{1-6}$ alkyl or aryl group.

Some of the suitable aldehydes are

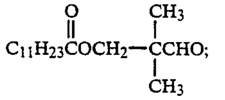 (i)

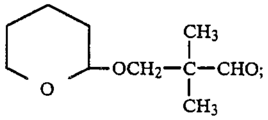 (ii)

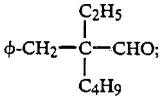 (iii)

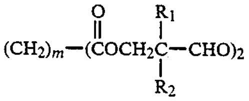 (iv)

wherein $R_1$ and $R_2$ are selected from methyl, ethyl, butyl, and mixtures thereof, and m is 4 or 7;

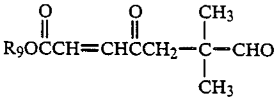 (v)

wherein $R_9$ is methyl, ethyl, or butyl;

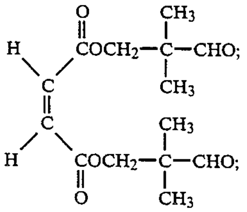 (vi)

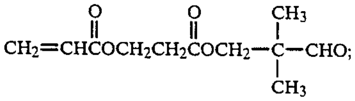 (vii)

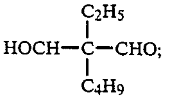 (viii)

-continued

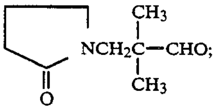 (ix)

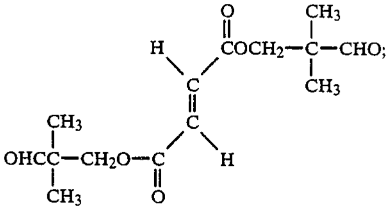 (x)

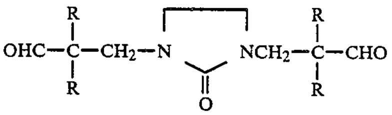 (xi)

wherein R is methyl, a 1/1 mixture of ethyl and butyl, or a 0.82/0.09/0.09 mixture of methyl, ethyl, and butyl;

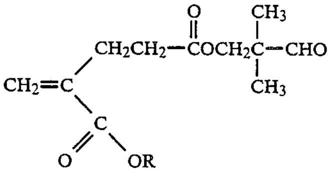 (xii)

wherein R is methyl or ethyl;

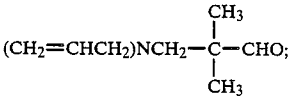 (xiii)

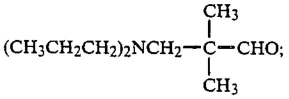 and (xiv)

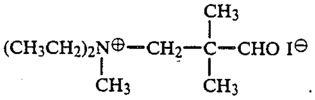 (xv)

Some of the suitable imines are

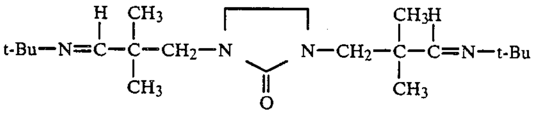 (i)

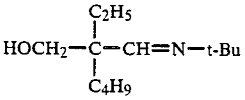 (ii)

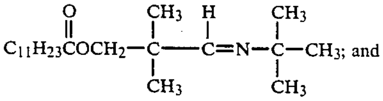 and (iii)

-continued

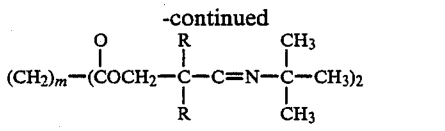

(iv)

wherein m is 4 and R is methyl, ethyl, and butyl. $R_3$ can also be selected from:

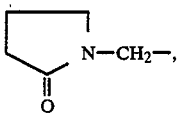

,

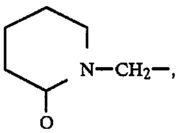

, and

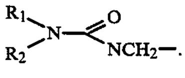

.

or a radical of the formula

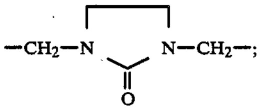

; or

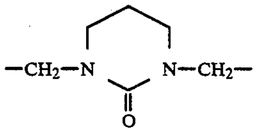

or

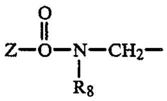

wherein $R_8$ is a $C_{1-6}$ alkyl or aryl, and Z is $NR_8R_8$.

In the imines, A can be of the formula

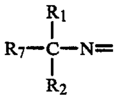

wherein $R_7$ is $C_{1-6}$ alkyl or aryl.

A problem with some of the aldehydes of the invention, even the preferred ones, is poor pot stability of the aldehyde/vinyl unsaturated system mixtures, apparently due to premature oxidation of the aldehyde. This problem can be solved by using the corresponding imine of the invention which is in a sense a chemically blocked form of the aldehyde. However, ambient moisture is needed to hydrolyse the imine to the active aldehyde.

An alternative to the imine approach is to use oxime or thiuram stabilizers to preserve the pot life of aldehyde/vinyl unsaturated system mixtures. One suitable thiuram is tetramethyl thiuram disulfide (TMTDS), which is most preferred. One suitable oxime is methyl ethyl ketone oxime.

The oxygen scavengers of the invention are most useful in vinyl unsaturated systems which would not readily polymerize under aerobic conditions, and in such widely diverse applications as aqueous or solvent based coatings, impregnates, plastics, reinforced plastics, tank linings, gel coatings, and polymer concrete. The vinyl unsaturated systems are monomers, oligomers, and/or polymers which undergo free radical polymerization and are polymerized from such monomers as:

i. Mono, di- and trifunctional acrylates and methacrylates
ii. fumarates
iii. maleates
iv. vinyl esters
v. styrenes
vi. acrylamides
vii. acrylonitrile
viii. itaconate esters
ix. alpha-methylene glutarate esters
x. acryloxyproprionic acid and esters
xi. methacrylic acid or acrylic acid.

Such polymers as:

i. maleate containing polyesters
ii. fumarate containing polyesters
iii. itaconate containing polyesters
iv. alpha-methylene glutarate containing polyesters
v. vinyl resins
vi. urethane multi ((meth)acrylates)
vii. polyester multi ((meth)acrylates)

can comprise the vinyl unsaturated system.

The vinyl unsaturated system can also include additive(s) selected from pigments, colorants, sand, glass fibers, surfactants, dispersants, and defoamers.

The usual ratio of aldehyde or imine to vinyl unsaturated system is about 1 to 20 parts by weight aldehyde or imine and about 99 to 80 parts by weight vinyl unsaturated system.

Mixtures of aldehydes and imines can be used.

In the aldehyde or imine formula, $R_1$ cannot be connected to $R_2$ so that benzaldehyde is excluded from the scope of the formula.

A preferred mixture of aldehydes is the reaction production of (a) ethylene urea, (b) formaldehyde, (c) isobutyraldehyde, and (d) 2-ethyl hexyl aldehyde in a molar ratio of (a):(b) of 1:2 and of (a) to the sum of (c) and (d) of 1:2. A particularly preferred group of imines is the reaction product of the just-mentioned aldehyde mixture with t-butyl amine. The following examples are presented to illustrate a few embodiments of the invention but are not intended to be limiting thereto. In these examples all parts and percentages are by weight unless otherwise indicated.

The following abbreviations are utilized in the examples which follow.

IDMA = isodecyl methacrylate
IBOMA = isobornyl methacrylate
IBOA = isobornyl acrylate
HPMA = hydroxypropyl methacrylate
TEGMA = tetraethylene glycol dimethacrylate
DCPOMA = dicyclopentenyloxyethyl methacrylate
$C_8AM$ = N-nonyl acrylamide
TMPTA = trimethylol propane triacrylate
LMA = lauryl methacrylate
CEMA = cetyl iscosyl methacrylate
IDMA = isodecyl methacrylate

EXAMPLES

Example 1

Preparation of 2-Oxoimidazolidine-1,3-bis (2,2-dimethylpropanal)

A 500 ml., three-necked flask equipped with a thermometer, condenser, and mechanical stirrer was charged, under nitrogen blanket, with 86.1 g of 2-imidazolidone (ethyleneurea, 1.0 mole), 151 g. of isobutyraldehyde (2.1 moles), and 162 g. of 37% aqueous formaldehyde solution (2.0 moles). A mild exotherm resulted (22°-45° C.). On addition of 21.5 g of 50% aqueous sulfuric acid solution (w/w), the temperature of the reaction mixture rose to 58° C. with the onset of reflux. To maintain reflux, the temperature of the reaction mixture was gradually increased, reaching 95° C. after 2.75 hours. The product was cooled and neutralized with 50% aqueous sodium hydroxide solution. After standing for several hours, two layers formed.

The organic layer was decanted from the aqueous (bottom) layer, then mixed with methylene chloride (500 l.) and extracted with two, 100 ml. portions of water. Methylene chloride and tracese of water were stripped from the product using a rotary evaporator, affording 254 g. of product/(100% yield) as a yellow oil which crystallized slowly on cooling. Further purification of the product by recrystallization from methylene chloride and ethyl ether gave 175 g. of colorless crystals, mp 83°-84° C. NMR ($CDCL_3$); 9.63 (s, 2H, —CHO), 3.35 (s. 4H, —$CH_2$—), 3.30 (s, 4H, —$CH_2$—), and 1.10 (s, 12H, —$CH_3$). The product is slightly soluble in water (5 wt. %) and readily soluble in common polar organic solvents.

Example 2

Preparation of 2-Oxiomidazoline-1,3-bis (dialkylpropanal)

A 1000 ml. four-necked flask equipped with a thermometer, condenser, mechanical stirrer, and nitrogen ebullator was charged with 215.3 g. ethyleneurea (2.5 moles), 150.0 g. paraformaldehyde (5.0 moles), and 100 g. water. Aqueous sulfuric acid (50%, 8.0 g., 0.04 mole) was then added slowly to the slurry, with stirring, over a period of 15 minutes. A moderate exotherm resulted (25°-60 ° C.). When the exotherm ceased, 72.1 g. isobutyraldehyde (1.0 mole) was added over 15 minutes while concurrently heating the reaction mixture to 80° C. After a 15 minute hold at temperature, at which point essentially all of the isobutyraldehyde had been consumed, the mixture was heated to 100° C. and 192.3 g. 2-ethylhexanal (1.5 moles) was added over 15 minutes. The temperature was maintained between 95° C. and 100° C. for 2.5 hours. The reactor was cooled to 80° C. and 185.0 g. isobutyraldehyde (2.56 moles) was then added over 30 minutes. A 1.5 hour hold at reflux completed the condensation. The mixture was cooled to 70° C. and treated with 5.0 g. of sodium hydroxide pellets (0.125 mole) to effect catalyst neutralization. After 15 minutes of agitation, the stirrer was stopped to allow phase separation (rapid) and removal of the aqueous (bottom) layer. Unreacted isobutyraldehyde and water were then distilled in vacuo (80° C., 20 mm). Filtration of the residue through a Celite pad afforded 684 g. of product (95% yield) as a light yellow oil with a Brookfield viscosity of 6,000 cps at 25° C.

Example 3

Preparation of 2,2-Dimethyl-3-oxopropyl Laurate

To a hot (80° C.) solution of lauric acid (70 g., 0.35 mole), and hydroxypivaldehyde (30.6 g., 0.3 mole) in 120 g. of toluene was added 1.75 g. of p-toluenesulfonic acid monohydrate (0.009 mole). The mixture was then heated at total reflux for 1.5 hrs. and water generated in the reaction mixture was removed by azeotropic distillation. The reaction mixture was cooled, washed with saturated aqueous sodium bicarbonate and brine, then dried over magnesium sulfate, filtered, and evaporated in vacuo. GLC analysis of the product showed that it contained 90% of the desired laurate ester. Fractional distillation of the crude sample gave a product cut, b.p. 180° C./4.0 mm, of 95% purity (GLC, area %). NMR ($CDCL_3$): 9.73 (s, 1H,—CHO), 4.2 (s, 2H, —$CO_2C$-$H_2$—), 2.3 (t, 2H, —$CH_2CO_2$—), 0.9-1.9 (m, 23H, $CH_2(CH_2)_{10}CH_2CO_2$—), and 1.17 (s, 6H, —$C(CH_2)_2$.

Example 4

Preparation of Bis(2,2-dimethyl-3-oxopropyl) Fumarate

Crude bis (2,2-dimethyl-3-oxopropyl) maleate was treated with a catalytic amount of morpholine (10 wt. %) in refluxing toluene for 4 hrs. The resulting solution was cooled to room temperature, washed with diluted hydrochloric acid and brine, then dried over magnesium sulfate. Evaporation of volatiles in vacuo gave crud bis (2,2-dimethyl-3-oxopropyl) fumarate in essentially quantitative yield. NMR* ($CDCL_3$): 9.7 (s, 1H,—CHO), 6.93 (s, 2H, trans —CH=CH—), 4.33 (s, 2H, —$CO_2CH_2$—), and 1.2 (s, 6H, —$C(CH_3)_2$—).

*Obtained with a distilled sample of bis (2,2-dimethyl-3-oxopropyl) fumarate, m.p. 55° C.

Example 5

Preparation of Bis(2,2-dimethyl-3-oxopropyl) Azelate

A 3 liter, four-necked flask equipped with a mechanical stirrer, nitrogen sparage, steam-jacketed additional funnel, Dean-Stark trap and condenser was charged with 380 g. of azelaic acid )2moles), 500 g. of toluene and 13.3 g. of p-toluenesulfonic acid monohydrate (0.07 mole). The mixture was heated at reflux, yielding an homogeneous solution within 20 minutes. To the reaction mixture was then dropwise added a preheated solution of 450 g. of hydroxypivaldehyde (4.4 moles) in 500 g. of toluene. Water was removed azeotropically via the Dean-Stark trap. When the reaction was complete, the mixture was cooled to room temperature and washed with saturated aqueous sodium bicarbonate and brine, then dried over magnesium sulfate and evaporated in vacuo giving 720 g. of the crude dialdehyde azelate. GLC analysis (area %) indicated that the product contained 75% of bisaldehyde azelate. NMR ($CDCL_3$): 9.7 (s, 2H, —CHO), 4.26 (s, 4H, —$CO_2CH_2$—), 2.3 (t, 4H, —$CH_2CO_2$—), 0.9-1.8 (m, 10H, —$O_2CH_2$—($CH_2$-)$_5$—$CH_2CO_2$—), and 1.2 (s, 12H, —$C(CH_3)_2$—).

Example 6

Preparation of Bis (t-Butyl Imine) of Example 1

A 500 ml. three-necked flask equipped with a thermometer, mechanical stirrer, Dean-Stark trap, and condenser was charged, under a nitrogen blanket, with 50.8 g. 2-oxoimidazolidine-1,3-bis (2,2-dimethyl propanal) (0.2 mole), 50 g. t-butylamine (0.65 mole) and 200 g. methylene chloride. The reaction mixture was heated to reflux (46° C.) and water was removed azeotropically. After a total of 20 hours at reflux, the theoretical amount of water was isolated (7 ml.). The reaction was cooled and the crude product was stripped on a rotary evaporator. Upon cooling, the residue solidified to give the bisimine as a colorless waxy solid, mp 46°-47° C.

Example 7

Use of Aldehydes/Imines as Oxygen Scavengers in Thin Film Polymerizations

A filter paper matrix was used to approximate thin film conditions. The sample to be tested is weighed onto an approximately equal weight of filter paper (Whatman No. 1). Weight changes are followed with time. At selected intervals the test sample is extracted with chloroform (or $CDCL_3$) and the weight % extractables determined. The extractables may be subjected to a variety of tests as warranted (i.e. nmr/ir spectrum, titration, elemental analysis). If the sample to be tested is a solid or a high viscosity liquid the material is diluted with chloroform prior to absorption onto the filter paper.

Monomers
Monomer Cures in a Filter Paper Matrix
0.1% Co++; rt

| Monomer(s) | Ratio | Cure[1] Time | Sol. F[2] |
|---|---|---|---|
| TEGMA | 100 | >>3 days | — |
| TEGMA/EX. 1 | 98/2 | >>2 days | — |
| | 95/5 | >2 days | — |
| | 90/10 | 1 day | 0.29 |
| | 80/20 | 4-5 hours | 0.16 |
| | 70/30 | 4-5 hours | 0.30 |
| IBOMA/EX. 1 | 95/5 | 2 days | — |
| | 90/10 | 2 days | 1.00 |
| | 80/20 | 1 day | 0.99 |
| TMPT/EX. 1 | 90/10 | 1 day | 0.22 |

[1]Cure = no methacrylate in nmr spectrum of soluble fraction.
[2]Fraction of material which can be extracted from the filter paper by chloroform post cure.

Example 8

Thin Film Oxidative Polymerizations with Aldehyde of Example 2—Filter Paper Matrix/1 day/rt/0.1% CO++

Using the aldehyde of Example2 in a system, the following data was observed:

| Sample | Ratio | % Evap. | % Monomer | % Polymer | Nature of Polymer |
|---|---|---|---|---|---|
| IDMA/EX. 2 | 90/10 | 10.5 | 89.5 | 0 | |
| | 80/20 | 6.0 | 54 | 40 | soluble |
| IBOMA/EX. 2 | 90/10 | 20 | 40 | 40 | soluble |
| | 80/20 | 7 | 23 | 70 | soluble |
| IBOA/EX. 2 | 90/10 | 35 | 20 | 45 | soluble |
| | 80/20 | 5.5 | 10 | 85 | soluble |
| HPMA/EX. 2 | 90/10 | 52 | 0 | 48 | soluble |
| | 80/20 | 13 | 0 | 87 | loose gel |
| TEGMA/EX. 2 | 90/10 | +4 | 0 | 104 | gel |
| | 80/20 | +2 | 0 | 102 | gel |
| DCPM/EX. 2 | 90/10 | +2 | 0 | 102 | gel |
| | 80/20 | +2 | 0 | 102 | gel |
| $C_8$Am/EX. 2 | 90/10 | 6 | 20 | 74 | soluble |
| | 80/20 | 5 | 0 | 95 | soluble |

Example 9

Cure of Unsaturated Polyester Resin with Aldehyde Oxygen Scavenger

An aldehyde which was of the formula

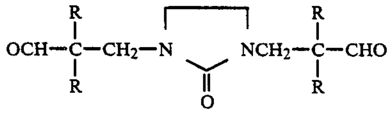

wherein R is a 1/1 mixture of Et and Bu was used in a 1 mil film; 0.1% CO++; 2 days; room temperature experiment using a fumaric acid/neopentyl glycol (1/1) unsaturated polyester, and the following data resulted:

| System | | Equiv CHO/db | Soluble Fraction in $CHCl_3$ |
|---|---|---|---|
| Unsaturated Polyester (UPE) | | — | 1.01 |
| Aldehyde | | — | 1.00 |
| UPE/aldehyde | = 9/1 | 0.15 | 0.44 |
| | = 8/2 | 0.34 | 0.23 |
| | = 7/3 | 0.59 | 0.23 |

Example 10

Monomer Evaluation in Unfilled Castings

The following unfilled castings were prepared at room temperature to determine the effect of the oxygen scavenger aldehyde in Example 2.

| HPMA + | Catalysts[1] | Cure Time (min) | 24 Hr. Surface |
|---|---|---|---|
| IDMA | CHP/Co | NC* | Liquid |
| DPMA | CHP/Co | 360 | Liquid |
| LMA | CHP/Co | NC | Liquid |
| CEMA | CHP/Co | 300 | Liquid |
| IDMA | CHP/Co/Example 2 | 124 | Hard |
| DPMA | CHP/Co/Example 2 | 100 | Hard |
| LMA | CHP/Co/Example 2 | 95 | Hard |
| CEMA | CHP/Co/Example 2 | 70 | Hard |

*NC = No Cure
[1]2% Cumene Hydroperoxide; 0.13% $Co^{++}$+; 3% Aldehyde

Example 11

Comparison of Aldehyde of Example 9 with Imine of Example 6

This example demonstrates the advantage to the imines as to pot stability:

| Sample (+0.1% $Co^{++}$) | Approx. Cure Times (rt) Solution | Thin Film |
|---|---|---|
| Tetraethyleneglycol dimethacrylate | 5-9 days | 9 days |
| Tetraethyleneglycol dimethacrylate/Example 9 (9/1) | <<1 day | <1 day |
| Tetraethyleneglycol dimethacrylate/Example 6 (9/1) | 12-14 days | <1 day |
| Dicyclopentenyloxyethyl methacrylate | <1 day | 2-5 days |
| Dicyclopentenyloxyethyl methacrylate/Example 9 (9/1) | <<1 day | <1 day |
| Dicyclopentenyloxyethyl methacrylate/Example 6 (9/1) | <1 day | <1 day |
| Unsaturated Polyester Resin[1] | >10 days | >10 days |
| Unsaturated Polyester Resin/Example 9 (8/2) | <1 day | 1 day |
| Unsaturated Polyester Resin/Example 6 (8/2) | >10 days | >10 days[2] |

[1]Unsaturated polyester resin prepared from fumaric acid and neopentyl glycol.
[2]After 3 days at rt, thin film cured well at 3 hours/60° C.

Example 12

Effect of Cobalt Ions and Thiuram on Pot Stability

This example shows the effect tetramethyl thiurom disulfide (TMTDS) as a stabilizer for aldehyde promoted oxidative polymerizations. Twenty parts of the aldehyde of Example 2 was mixed with 80 parts trifunctional acrylate monomer and to this mixture was in turn added selected amounts of Co++ and TMTDS with the following results:

| 0.2% Co++ | 1000 ppm TMTDS | Pot Stability | Cure Time (thin film) |
|---|---|---|---|
| − | − | 4–20 hours | no cure |
| + | − | <2 hours | 4–20 hours |
| − | + | 1 month | no cure |
| + | + | 6–9 weeks | 20–24 hours |

Example 13

Use of Oxime Stabilizer

This example demonstrates the use of methyl ethyl ketone oxime (Exkin No. 2) in a TEGMA/Cymel 303/Tetraethylene glycol Dimethacrylate/Cobalt (56.2/18.8/20/5/0.06/0.5 Cycat 600) binder formulation.

| Exkin No. 2 | Viscosity (Brookfield, cps/ICI, poise) | | | |
|---|---|---|---|---|
| (Percent on Binder) | Initial | 3 Days | 5 Days | 10 Days |
| — | 105/1.28 | Gelled | | |
| 0.15 | 105/1.25 | 160/1.42 | 145/1.50 | 170/1.68 |
| 0.30 | 110/1.22 | 160/1.35 | 140/1.42 | 165/1.58 |
| 0.60 | 105/1.22 | 150/1.32 | 135/1.40 | 155/1.50 |
| — | 130/1.42 | Gelled | | |

Example 14

UV Cure of Diacrylate of Bisphenol A Diepoxide Using Aldehyde Oxygen Scavenger Forty parts diacrylate of Bisphenol A diepoxide (Shell DRH-370 brand), 60 parts DCPOMA, and 2 parts diethoxyacetophenone were exposed to equal levels of UV radiation with the following results:

| Oxygen Scavenger | Film Thickness (Mils) | Result |
|---|---|---|
| — | 1-1.5 | Hard, slight tack |
| 10% EX. 9 | 1-1.5 | Hard, tack free |
| — | <0.5 | Moderate tack |
| 10% EX. 9 | <0.5 | Tack free |

Example 15

Aldehyde Oxygen Scavenger Effect on Surface Cure of Unsaturated Polyester Castings When 2% of the aldehyde of Example 2, when added to an unsaturated polyester/unsaturated monomer casting resin formulation containing 1% benzoyl peroxide, 0.6% Co++, 0.2% dimethyl aniline at polyester/monomer ratios of between 38/62 and 65/35, and using as monomers either dicyclopentenyloxyethyl methacrylate, dicyclopentenyloxyethyl acrylate, or styrene, a hard, tack-free surface was obtained versus either a liquid or very tacky surface when the aldehyde was deleted.

Example 16

Use of Oxygen Scavengers in Polymer Concrete

The oxygen scavenger aldehydes of Example 9 and Example 1 were used as levels up to 20% based on polymer concrete formulations containing sand, silica flour, $Fe_3O_4$, $TiO_2$, benzoyl peroxide, catalyst, acrylic resin, and acrylic monomer, with excellent results as to improving cure and adhesion characteristics.

| Aldehyde (Ex.) | Level | Pot Life (hrs.) | Cure Speed (hrs.) | Surface Cure (16 hrs.) | Quality Adhesion |
|---|---|---|---|---|---|
| 0 | 0 | 3½ | None | None | None |
| 9 | 2 | 3 | None | None | None |
| 1 | 2 | 3 | None | None | None |
| 9 | 5 | 3½ | 4 | Excellent | Excellent |
| 1 | 5 | 3½ | 4 | Excellent | Excellent |
| 9 | 10 | 2½ | 3 | Excellent | Excellent |
| 1 | 10 | 3 | 3 | Excellent | Excellent |
| 9 | 20 | 2 | 2½ | Excellent | Excellent |
| 1 | 20 | 3 | 3 | Excellent | Excellent |

Although the invention has been described in great detail herein, various modifications, alternatives, and improvements thereto should become readily apparent to those skilled in the art without departing from the spirit and scope thereof.

We claim:

1. Composition comprising (A) an aldehyde or imine of the formula $$R_3Q_n$$

wherein n is 1–4; $R_3$ is an organic radical having a valence of 1–4; Q is of the formula

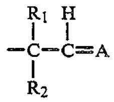

wherein A is O or $NR_4$; $R_1$, $R_2$, and $R_4$ are independently selected from $C_{1-6}$ alkyl or aryl radicals or mixtures thereof; and (B) a transition metal ion selected from the group consisting of $Co^{++}$, $Cu^{++}$, and $Mn^{++}$, wherein said composition has the characteristics of an oxygen scavenger in the polymerization of one or more vinyl unsaturated monomers, oligomers and/or polymers in the presence of oxygen.

2. Composition comprising (A) an aldehyde and (B) a transition metal ion selected from the group consisting of $Co^{++}$, $Cu^{++}$ and $Mn^{++}$, wherein (1) said composition has the characteristics of an oxygen scavenger in the polymerization of one or more vinyl unsaturated monomers, oligomers and/or polymers in the presence of oxygen and (2) said aldehyde is selected from the group consisting of

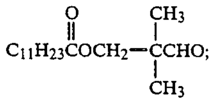

(i)

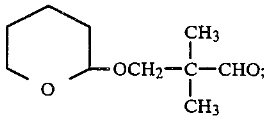

(ii)

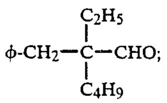

(iii)

-continued

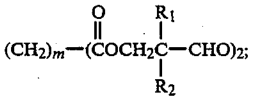

(iv)

wherein $R_1$ and $R_2$ are selected from methyl, ethyl, butyl, and mixtures thereof, and m is 4 or 7;

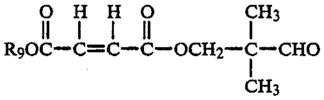

(v)

wherein $R_9$ is methyl, ethyl, or butyl;

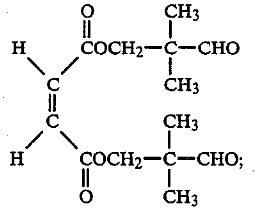

(vi)

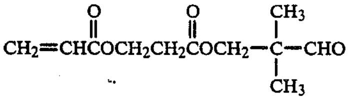

(vii)

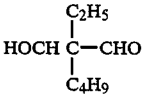

(viii)

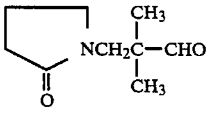

(ix)

-continued

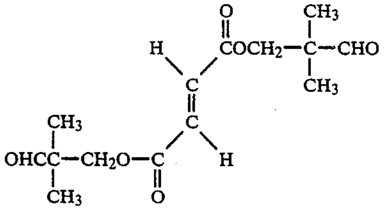

(x)

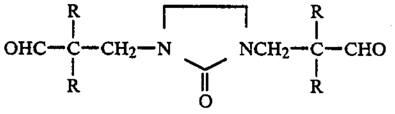

(xi)

wherein R is methyl, a 1/1 mixture of ethyl and butyl, or a 0.82/0.09/0.09 mixture of methyl, ethyl, and butyl;

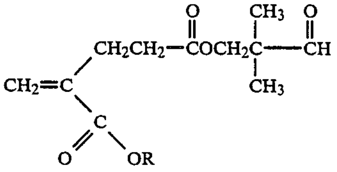

(xii)

wherein R is methyl or ethyl;

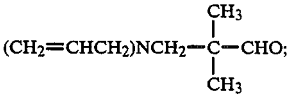

(xiii)

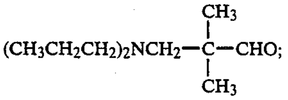

(xiv)

and

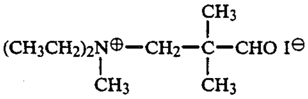

(xv)

3. Oxygen scavenging composition comprising a mixture of aldehydes which are the reaction product of (a) ethylene urea, (b) formaldehyde, (c) isobutyraldehyde, and (d) 2-ethylhexanal in a molar ratio of (a):(b) of 1:2 and of (a) to the sum of (c) and (d) of 1:2.

* * * * *